Nov. 21, 1950     F. B. WILLIAMS     2,531,095
VEHICLE BRAKE CABLE OILER
Filed Sept. 9, 1949
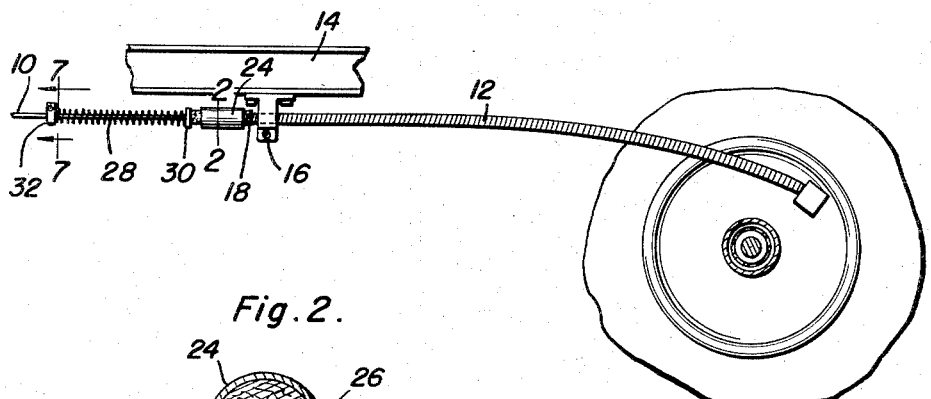
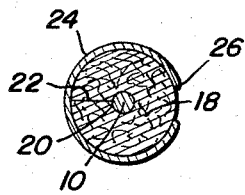
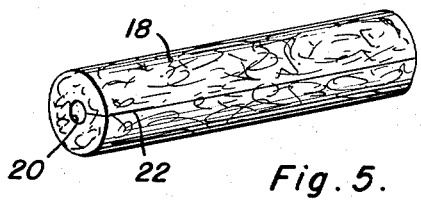
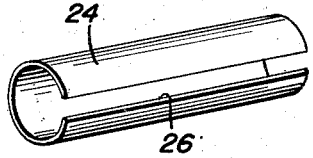
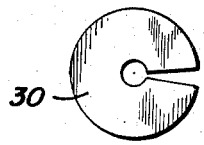
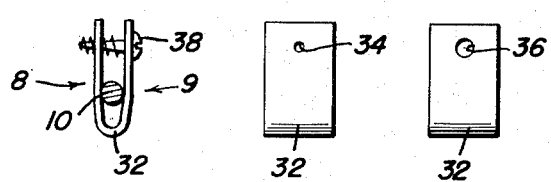
Francis B. Williams
INVENTOR.
BY *Clarence A. O'Brien*
*and Harvey B. Jacobson*
                         *Attorneys*

Patented Nov. 21, 1950

2,531,095

UNITED STATES PATENT OFFICE 2,531,095

VEHICLE BRAKE CABLE OILER

Francis B. Williams, Columbus, Ohio

Application September 9, 1949, Serial No. 114,827

5 Claims. (Cl. 184—16)

This invention relates to new and useful improvements in lubricating attachments for vehicles and the primary object of the present invention is to provide a vehicle brake cable oiler.

Another important object of the present invention is to provide a vehicle brake cable oiler that is quickly and readily applied to or removed from a vehicle brake cable in a convenient manner without in any way disturbing the normal use, construction or placement of the brake cable on which the same is applied.

Yet another object of the present invention is to provide a vehicle brake cable oiler that will considerably increase the durability and life of a brake cable by keeping the cable free of rust and/or corrosion.

A further object of the present invention is to provide an attachment for vehicle brake cables that is extremely small and compact in structure.

A still further aim of the present invention is to provide a device of the aforementioned character that is simple and practical in construction, strong and reliable in use, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary side elevational view of a portion of a vehicle and showing the present invention applied thereon;

Figure 2 is an enlarged vertical sectional view taken substantially on the plane of section line 2—2 of Figure 1;

Figure 3 is a perspective view of the absorbent cable embracing sleeve used in connection with the present invention;

Figure 4 is a perspective view of the resilient sleeve surrounding the tube used in conjunction with the present invention;

Figure 5 is a plan view of the washer used in conjunction with the present invention;

Figure 6 is a side view of Figure 5;

Figure 7 is an enlarged vertical sectional view taken substantially on the plane of section line 7—7 of Figure 1;

Figure 8 is a side elevational view of Figure 7 taken substantially in the direction of arrow numbered 8 in Figure 7; and, Figure 9 is a side elevational view of Figure 7 taken substantially in the direction of arrow numbered 9 in Figure 7.

Referring now to the drawings in detail, wherein for the purposes of illustration, there is disclosed a preferred embodiment of the present invention, the numeral 10 represents a vehicle brake cable that is slidably received in a casing 12, the latter being secured to a part 14 of the vehicle by a bracket 16.

The present invention does not attempt to claim the above well known and conventional structure but is merely a device to be used in conjunction therewith to prevent rusting or corrosion of the brake cable 10.

To accomplish the above desired results, there is provided an absorbent cylindrical sleeve 18, of preferably felt material, having an axial bore 20 and a radial slit or slot 22 intersecting the bore 20. The sleeve 18 is saturated with a suitable lubricant such as oil. The sleeve 18 is placed on the cable 10 by slipping the cable 10 through the slit 22 and into the bore 20.

A split tube 24, of resilient material, yieldingly embraces the sleeve 18 and forces the inner walls of the bore 20 against the outer periphery of the cable 10. The tube 24 is rotated upon the sleeve 18 so that the split 22 in the sleeve 18 is disposed diametrically opposite from the slot 26 in the tube 24.

Means is provided for yieldingly urging the sleeve 18 against one end of the casing 12 to prevent water or the like from entering the casing 12. This means comprises a coil spring 28 that embraces the cable 10 and which bears against a split washer 30 received on the cable 10 and abutting one end of the sleeve 18.

An abutment is provided for the coil spring 28 and assumes a substantially U-shaped bracket clamp or clip 32 having opposed, different diameter, openings 34 and 36 in its leg portions. A screw or fastener 38 is threaded in the openings 34, 36 and retains the member 32 adjusted longitudinally on the cable 10 to adjust the resiliency of the spring 28 acting upon the washer 30 and sleeve 18 so that the sleeve 18 will abut one end of the casing 12.

Obviously, any suitable resilient means could be utilized to urge the sleeve 18 against one end of the casing 12, such as a spring pulling the sleeve 18 toward the casing instead of the pushing spring 28 shown, in which instance the spring would embrace the casing 12 or be secured to a part of the vehicle.

Furthermore, any suitable bracket could replace the clamp 32 in order to reduce the entire cost of the elements constituting the present invention.

In view of the foregoing description taken in conjunction with the accompanying drawings, it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In combination with a vehicle brake cable and a casing for the cable of a brake cable oiler, said brake cable oiler comprising an absorbent sleeve embracing the cable, a member surrounding the sleeve and clamping the same about the brake cable, and means associated with the brake cable and yieldingly urging the sleeve against one end of the casing.

2. The combination of claim 1 wherein said sleeve includes a cylindrical element having an axial bore, and a radial slot in said element intersecting said bore.

3. The combination of claim 1 wherein said member comprises an elongated split tube of resilient material.

4. The combination of claim 1 wherein said means includes an abutment secured to said cable, and a coil spring embracing said cable and biased between said abutment and said sleeve.

5. The combination of claim 4 wherein said abutment includes a clamp slidably adjustable on said cable adjacent said casing.

FRANCIS B. WILLIAMS.

REFERENCES CITED

The following references are of record in the file of this patent:

UNITED STATES PATENTS

| Number | Name | Date |
|---|---|---|
| 1,589,108 | Caretta | June 15, 1926 |
| 1,902,585 | Sanford | Mar. 21, 1933 |

FOREIGN PATENTS

| Number | Country | Date |
|---|---|---|
| 746,071 | France | Feb. 27, 1933 |